(12) United States Patent
Chen et al.

(10) Patent No.: US 11,741,392 B2
(45) Date of Patent: Aug. 29, 2023

(54) DATA SAMPLE LABEL PROCESSING METHOD AND APPARATUS

(71) Applicant: ADVANCED NEW TECHNOLOGIES CO., LTD., Grand Cayman (KY)

(72) Inventors: Fan Chen, Hangzhou (CN); Xiang Qi, Hangzhou (CN); Desheng Wang, Hangzhou (CN); Hanbin Wang, Hangzhou (CN); Qilin Guo, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 346 days.

(21) Appl. No.: 16/746,757

(22) Filed: Jan. 17, 2020

(65) Prior Publication Data

US 2020/0151578 A1   May 14, 2020

Related U.S. Application Data

(63) Continuation of application No. PCT/CN2018/102732, filed on Aug. 28, 2018.

(30) Foreign Application Priority Data

Nov. 20, 2017 (CN) .......................... 201711160012.0

(51) Int. Cl.
  *G06N 20/00*   (2019.01)
  *G06N 3/088*   (2023.01)
  *G06N 3/045*   (2023.01)
(52) U.S. Cl.
  CPC ............. *G06N 20/00* (2019.01); *G06N 3/088* (2013.01); *G06N 3/045* (2023.01)

(58) Field of Classification Search
  CPC ............................ G06N 3/088; G06N 3/0454
  See application file for complete search history.

(56) References Cited

U.S. PATENT DOCUMENTS 5,956,419 A    9/1999 Kopec et al.
6,937,994 B1 *  8/2005 Iyengar ................. G06Q 30/02
                                              705/7.29

(Continued)

FOREIGN PATENT DOCUMENTS

CN   104166706 A   11/2014
CN   107016406 A   8/2017

(Continued)

OTHER PUBLICATIONS

Written Opinion of the International Searching Authority and International Search Report for PCT Application No. PCT/CN2018/102732 dated Oct. 26, 2018 (9 pages).

(Continued)

*Primary Examiner* — Paulinho E Smith

(57) ABSTRACT

Disclosed are a data sample label processing method and apparatus. The data sample label processing method comprises: obtaining a first set of data samples without determined labels and a second set of data samples with determined labels; performing an iteration with the following steps until an accuracy rate meets a preset requirement: training a prediction model based on a combination of the first set of data samples and the second set of data samples; inputting data samples from the first set of data samples into the prediction model to obtain prediction values as learning labels for each data sample, and associating the learning labels with the data samples respectively; obtaining a subset from the first set of data samples, wherein the subset comprise data samples associated with learning labels; obtaining determined labels for the data samples in the subset; obtaining the accuracy rate based at least on the (Continued)

learning labels of the data samples in the subset and the determined labels of the data samples in the subset; and if the accuracy rate does not meet the preset requirement, labeling the data samples in the subset with the determined labels for the data samples in the subset, and moving the subset from the first set of data samples to the second set of data samples; and after the iteration ends, labeling the remaining data samples in the first set with the associated learning labels.

20 Claims, 4 Drawing Sheets

(56) References Cited

U.S. PATENT DOCUMENTS

| | | | |
|---|---|---|---|
| 7,844,567 B2 | 11/2010 | He et al. | |
| 7,958,068 B2 | 6/2011 | Smith et al. | |
| 8,417,648 B2 | 4/2013 | Hido et al. | |
| 8,788,498 B2 | 7/2014 | Kannan et al. | |
| 2005/0234955 A1 | 10/2005 | Zeng et al. | |
| 2007/0250522 A1 | 10/2007 | Perrizo | |
| 2010/0076923 A1 | 3/2010 | Hua et al. | |
| 2010/0088255 A1* | 4/2010 | Mann | G16B 30/10 706/12 |
| 2011/0314367 A1 | 12/2011 | Chang et al. | |
| 2013/0097103 A1 | 4/2013 | Chari et al. | |
| 2014/0201208 A1* | 7/2014 | Satish | G06F 21/564 707/737 |
| 2014/0279695 A1 | 9/2014 | Hsu et al. | |
| 2015/0095017 A1 | 4/2015 | Mnih et al. | |
| 2015/0313529 A1* | 11/2015 | Nevo | A61B 5/22 600/595 |
| 2016/0034788 A1 | 2/2016 | Lin et al. | |
| 2018/0053097 A1 | 2/2018 | Soni et al. | |
| 2018/0150746 A1* | 5/2018 | Tu | G06N 3/088 |
| 2018/0336471 A1* | 11/2018 | Rezagholizadeh | G06N 3/0454 |
| 2019/0034766 A1 | 1/2019 | Chen et al. | |
| 2019/0080433 A1* | 3/2019 | He | G06N 3/0454 |
| 2019/0188212 A1 | 6/2019 | Miller et al. | |

FOREIGN PATENT DOCUMENTS

| | | |
|---|---|---|
| CN | 107220600 A | 9/2017 |
| CN | 107292330 A | 10/2017 |
| CN | 104166706 B | 11/2017 |
| CN | 108021931 A | 5/2018 |
| TW | I560635 B | 12/2016 |
| WO | 2017/055878 A1 | 4/2017 |

OTHER PUBLICATIONS

Search Report for Taiwanese Application No. 107132422 dated Sep. 19, 2019.
First Search for Chinese Application No. 201711160012.0 dated Jan. 12, 2020 (1 page).
First Office Action for Chinese Application No. 201711160012.0 dated Jan. 21, 2020 (19 pages).
International Preliminary Report on Patentability Chapter I for PCT Application No. PCT/CN2018/102732 dated Jun. 4, 2020.
Supplementary Search for Chinese Application No. 201711160012.0 dated Jun. 1, 2020.
Zhang Qian, "Transfer learning method based on knowledge expression and its application", Sep. 30, 2015.
Wang, "Fault feature extraction method for sample imbalance", Feb. 28, 2016.
Extended European Search Report for Application No. 18879971.2, dated Oct. 30, 2020, 11 pages.
Zhu, Jia-Jie et al., "Generative Adversarial Active Learning", arXiv, Nov. 15, 2017, 11 pages.
Winterling, Timo et al., "Optimizing Labelling on Radar-Based Grid Maps Using Active Learning", 18th International Radar Symposium, German Institute of Navigation-DGON, Jun. 28, 2017, 6 pages.
Springenberg, Jost Tobias, "Unsupervised and Semi-supervised Learning with Categorical Generative Adversarial Networks", arVix, Apr. 30, 2016, published as a conference paper at ICLR 2016, 20 pages.
Sixt, Leon et al., "RenderGAN: Generating Realistic Labeled Data", arVix, Jan. 12, 2017, under review as a conference paper at ICLR 2017, 15 pages.
Antoniou, Antreas et al., "Data Augmentation Generative Adversarial Networks", arVix, Nov. 12, 2017, 13 pages.
Summons to attend oral proceedings pursuant to Rule 115(1) EPC for European Application No. 18 879 971.2 dated Jan. 19, 2022.
Examination and Search Report for Singapore Application No. 11202002326R, dated Jul. 12, 2021, 7 pages.
Souly et al., "Semi and Weakly Supervised Semantic Segmentation Using Generative Adversarial Network", arXiv:1703.09695v1, Mar. 2017, 13 pages.

* cited by examiner

DATA SAMPLE LABEL PROCESSING METHOD AND APPARATUS

CROSS REFERENCE TO RELATED APPLICATION

The present application is a continuation application of International Patent Application No. PCT/CN2018/102732, filed on Aug. 28, 2018, which claims priority to Chinese Patent Application No. 201711160012.0, filed on Nov. 20, 2017, and entitled "Data Sample Label Processing Method and Apparatus." The entire content of the above referenced applications is incorporated herein by reference.

TECHNICAL FIELD

Embodiments of the present specification relate to the field of data analysis technologies, and in particular, to a method and apparatus for labeling data samples.

BACKGROUND

In the field of machine learning, various forms of data models may be obtained through training with a large quantity of data samples, and the data models may be used to solve actual problems. Machine learning may be divided into supervised learning and unsupervised learning, wherein the supervised learning is a process of using a group of data samples of known classes to adjust parameters of a prediction model, so that the prediction model meets performance requirements. All the data samples used in the supervised learning are labeled samples, i.e., each sample simultaneously comprises a "feature" and a "label."

Supervised learning and unsupervised learning may be applicable to different scenarios. In exemplary applications, there are often cases where supervised learning needs to be used to solve a problem, but the labels of the data samples are inaccurate or even missing. Although theoretically the label of each data sample may be corrected or re-labeled manually, it is unrealistic in big data application scenarios. Therefore, how to achieve efficient and accurate labeling for data samples without determined labels has become an issue that has attracted great attention in the industry.

SUMMARY

With regard to the above technical problem, embodiments of the present specification provide a data sample label processing method and apparatus, and the technical solutions are as follows.

According to a first aspect of the embodiments of the present specification, a data sample label processing method is provided, the method comprising: obtaining a first set of data samples without determined labels and a second set of data samples with determined labels; performing an iteration with the following steps until an accuracy rate meets a preset requirement: training a prediction model based on a combination of the first set of data samples and the second set of data samples; inputting data samples from the first set of data samples into the prediction model to obtain prediction values as learning labels for each data sample, and associating the learning labels with the data samples respectively; obtaining a subset from the first set of data samples, wherein the subset comprise data samples associated with learning labels; obtaining determined labels for the data samples in the subset; obtaining the accuracy rate based at least on the learning labels of the data samples in the subset and the determined labels of the data samples in the subset; and if the accuracy rate does not meet the preset requirement, labeling the data samples in the subset with the determined labels for the data samples in the subset, and moving the subset from the first set of data samples to the second set of data samples; and after the iteration ends, labeling the remaining data samples in the first set with the associated learning labels.

In some embodiments, the method further comprises outputting the prediction model as a model applicable to the set of samples with indeterminate labels.

In some embodiments, the first set of data samples comprise data samples with undetermined labels, and the training a prediction model comprises: obtaining the prediction model by training the combination of the first set of data samples and the second set of data samples with a supervised learning algorithm.

In some embodiments, the first set of data samples comprise data samples without labels, and training a prediction model comprises: obtaining the prediction model by training the combination of the first set of data samples and the second set of data samples with a semi-supervised learning algorithm.

In some embodiments, the obtaining a first set of data samples without determined labels comprises: when a quantity of data samples in an initially obtained set of to-be-processed data samples does not meet a preset threshold, inputting the set of to-be-processed data samples into a Generative Adversarial Network (GAN) to obtain a set of generated data samples with a distribution same as the set of to-be-processed data samples; and combining the set of to-be-processed data samples and the set of generated data samples to obtain the first set of data samples.

In some embodiments, the inputting data samples from the first set of data samples into the prediction model comprises: inputting data samples in the set of to-be-processed data samples into the prediction model.

In some embodiments, if the set of to-be-processed data samples comprise data samples with undetermined labels, the inputting the set of to-be-processed data samples into a GAN to obtain a set of generated data samples with a distribution same as the set of to-be-processed data samples comprises: inputting both features and the undetermined labels of the set of to-be-processed data samples into the GAN to obtain a set of generated data samples with the distribution same as the set of to-be-processed data samples, wherein data samples in the set of generated data samples have undetermined labels; or inputting the features of the set of to-be-processed data samples into the GAN to obtain a set of generated data samples with the distribution same as the set of to-be-processed data samples, wherein the data samples in the set of generated data samples do not have labels.

In some embodiments, if the set of to-be-processed data samples comprise data samples without labels, the inputting the set of to-be-processed data samples into the GAN to obtain a set of generated data samples with a distribution same as the set of to-be-processed data samples comprises: inputting the features of the set of to-be-processed data samples into the GAN to obtain a set of generated data samples with the distribution same as the set of to-be-processed data samples, wherein the data samples in the set of generated data samples do not have labels.

According to a second aspect of the embodiments of the present specification, a system for labeling data samples is provided. The system comprises a processor and a non-transitory computer-readable storage medium storing instructions executable by the processor to cause the system to perform operations comprising: obtaining a first set of data samples without determined labels and a second set of data samples with determined labels; performing an iteration with the following steps until an accuracy rate meets a preset requirement: training a prediction model based on a combination of the first set of data samples and the second set of data samples; inputting data samples from the first set of data samples into the prediction model to obtain prediction values as learning labels for each data sample, and associating the learning labels with the data samples respectively; obtaining a subset from the first set of data samples, wherein the subset comprise data samples associated with learning labels; obtaining determined labels for the data samples in the subset; obtaining the accuracy rate based at least on the learning labels of the data samples in the subset and the determined labels of the data samples in the subset; and if the accuracy rate does not meet the preset requirement, labeling the data samples in the subset with the determined labels for the data samples in the subset, and moving the subset from the first set of data samples to the second set of data samples; and after the iteration ends, labeling the remaining data samples in the first set with the associated learning labels.

According to a third aspect of the embodiments of the present specification, a non-transitory computer-readable storage medium for labeling data samples is provided. The storage medium is configured with instructions executable by one or more processors to cause the one or more processors to perform operations comprising: obtaining a first set of data samples without determined labels and a second set of data samples with determined labels; performing an iteration with the following steps until an accuracy rate meets a preset requirement: training a prediction model based on a combination of the first set of data samples and the second set of data samples; inputting data samples from the first set of data samples into the prediction model to obtain prediction values as learning labels for each data sample, and associating the learning labels with the data samples respectively; obtaining a subset from the first set of data samples, wherein the subset comprise data samples associated with learning labels; obtaining determined labels for the data samples in the subset; obtaining the accuracy rate based at least on the learning labels of the data samples in the subset and the determined labels of the data samples in the subset; and if the accuracy rate does not meet the preset requirement, labeling the data samples in the subset with the determined labels for the data samples in the subset, and moving the subset from the first set of data samples to the second set of data samples; and after the iteration ends, labeling the remaining data samples in the first set with the associated learning labels.

Given that there is a set of data samples with determined labels, the technical solutions according to the embodiments of the present specification first learn the known information of the data samples with determined labels, perform preliminary labeling for a set of data samples without determined labels, so as to obtain learning labels for the set of data samples, then sample and check the learning labels, and feed a checked result back to the learning phase, such that re-learning is performed using the checked result. In the above learning manner, learning results are continuously improved until the requirements are met. By adopting the above solutions, a non-labeled data sample may be labeled or an inaccurate label of a data sample may be corrected by paying only a small checking cost, and moreover, a prediction model fitting the data samples without determined labels may be obtained based on the features of the data samples.

The above general description and following detailed description are merely exemplary and explanatory, which are not intended to limit embodiments of the present specification.

In addition, none of the embodiments of the present specification is required to achieve all the above-described effects.

BRIEF DESCRIPTION OF THE DRAWINGS

To more clearly describe the technical solutions of embodiments of the present specification or of the current technologies, the accompanying drawings to be used in the description of the embodiments or the current technologies will be briefly described. Apparently, the accompanying drawings in the description below are merely some of the embodiments of the present specification. Other drawings may be obtained by one of ordinary skill in the art according to these accompanying drawings.

DETAILED DESCRIPTION

To enable one of ordinary skill in the art to better understand the technical solutions of the embodiments of the present specification, the technical solutions of the embodiments of the present specification will be described in detail below with reference to the accompanying drawings in the embodiments of the present specification. Apparently, the described embodiments are merely some, but not all, embodiments of the present specification. All other embodiments obtained, based on some embodiments of the present specification, by one of ordinary skill in the art shall fall within the protection scope of the present specification.

In this specification, training data, training samples, and data samples are used interchangeably and refer to the data used to train a machine learning model.

In application scenarios of classifying and predicting data (for example, spam recognition, fraud recognition, and the like), it is ideal that each data sample of the training data carries a label, so that a prediction model may be obtained through supervised learning using the training data. Although the cost of labeling data samples is high, it is inevitable to invest to obtain a sufficient number of data samples having labels, such that an accurate prediction model may be obtained.

When a model obtained through training satisfies a performance (e.g., accuracy) requirement, the model may be used to classify and predict unknown data. In an exemplary application, however, the following situation may occur: due to differences in service fields, application scenarios, and other aspects, the unknown data and data samples used for training the model may not have exactly the same features. As a result, using the existing model to classify and predict the unknown data may not produce desired results. For example, in order to "recognize spams," a recognition model may be trained with transaction reviews on an e-commerce platform. If the recognition model is used to "recognize spams" in reviews on a video website, it is very likely that many recognition errors would occur.

Another similar problem is that a batch of data samples of a "new type" is provided to train a recognition model applicable to this batch of data samples. However, it is possible that this batch of data has no label at all, or that all or some pieces of this batch of data have undetermined labels where the accuracy of these undetermined labels cannot be guaranteed (e.g., probably caused by preliminary labeling or other reasons). For example, a batch of reviews on a video website is provided to train a model to recognize spam reviews. According to the current technologies, a high cost may be required to label this batch of data of the new type so as to meet the model training requirements.

Figure 1:
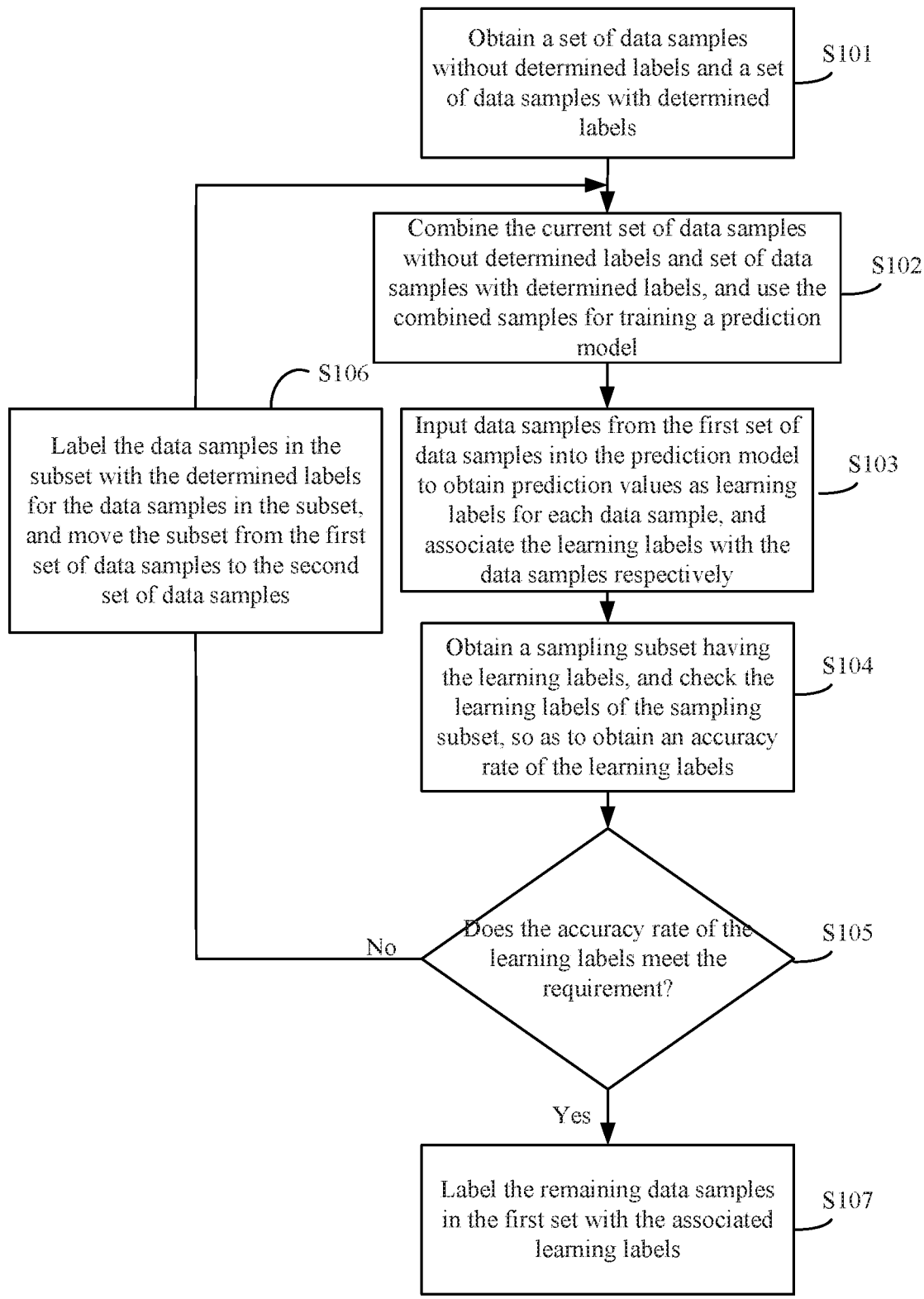
FIG. 1 is a flowchart of a method for labeling data samples according to some embodiments of the present specification.

The embodiments of the present specification provide a solution for labeling data samples. The design architecture of this solution is shown in FIG. 1, and an exemplary architecture is described below.

1) Input portion: "a set of data samples without determined labels" and "a set of data samples with determined labels" are used as input information. Here, it is possible that data samples in the "set of data samples without determined labels" may have no labels at all, or that all or some of the samples have undetermined labels where the accuracy of these undetermined labels cannot be guaranteed.

The "set of data samples with determined labels" refers to a set of existing data samples carrying reliable labels. The source of the data samples is not limited in the present specification, but this part may be regarded as known information.

In some embodiments, the "set of data samples without determined labels" and the "set of data samples with determined labels" have the same demand for overall application, but have different data features. For example, the "video website reviews" and "transaction platform reviews" in the foregoing examples are both used to recognize spam reviews, but reviews in different fields have their respective features. The former may be equivalent to the "set of data samples without determined labels" and the latter may be equivalent to the "set of data samples with determined labels." For ease of description, the signs "U" and "L" will be used below to represent the "set of data samples without determined labels" and the "set of data samples with determined labels," respectively.

2) Output portion: "labeling results for U" and "prediction model applicable to U" are used as output information. In an exemplary application, one of the above two types of output information may be needed.

3) Learning module: The learning module may be further divided into two sub-modules, training and labeling (not shown). In the training sub-module, a prediction model is obtained through training with a combination of U and L as the basis, wherein different training manners may be used according to different situations of U. For example, if all the data samples in U have labels, after U and L are combined, a supervised learning manner may be used for training to obtain the prediction model. As another example, if none of the samples in U has a label or only some samples in U have labels, after U and L are combined, a semi-supervised learning manner is used for training to obtain the prediction model. Therefore, regardless of which training manner is used, the trained model is applicable to prediction for two different data types since the training data covers different features of the two types of data. In the labeling sub-module, the model trained by the training sub-module may be used to predict data samples in U, and the prediction results are defined as "learning labels."

4) Checking module: Since a lot of "data samples without determined labels" are used in the training process of the learning module, the model obtained from the preliminary training typically cannot achieve an ideal result (unless there are many samples with correct labels in U. However, if this is the case, there is no need to use the combined samples for training). Therefore, the learning label needs to be checked.

In some embodiments, to ensure the reliability of a checking result, the checking may be performed in a manner involving human effort. The checking module may provide a display function for information (e.g., data samples, labeling results, etc.), and provide operating interfaces, such as labeling or correction, to facilitate the checking by relevant personnel. Provided that the reliability of the checking result is ensured, other manners may also be used to perform the checking, which is not limited in the present application.

Since the purpose of the checking module is to provide an overall assessment of whether a labeling result is ideal, not all the learning labels need to be checked here. A small amount of sampled data may be checked to lower the checking cost.

If the assessment result is not ideal, a new round of label learning may be triggered. In some embodiments, the data sampled from the "samples without determined labels" may be used as "samples with determined labels" after the label checking. Therefore, each time after the checking result is fed back to the label learning system, the accuracy rate of the label learning may be optimized. The two modules cooperate in the above manner to perform multiple times of re-learning until a checking result meets the requirements.

Figure 2:
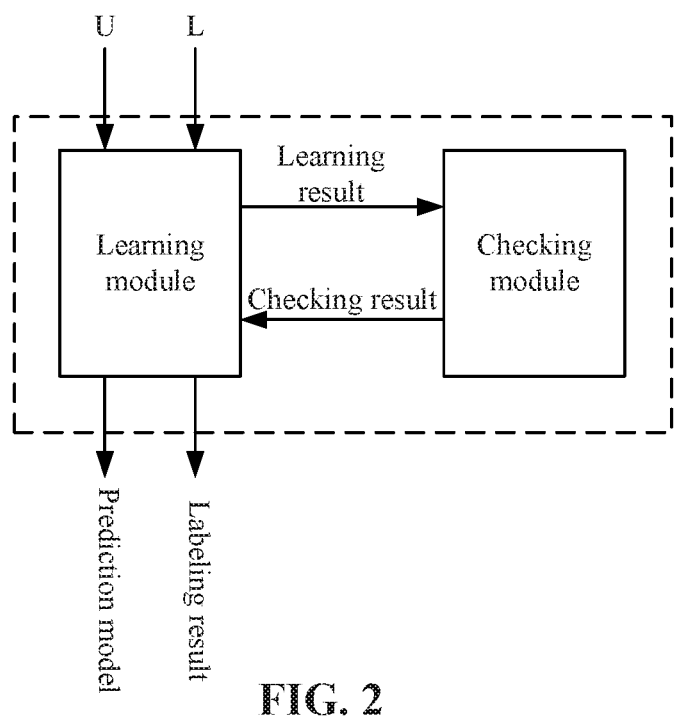
FIG. 2 is a schematic diagram of an overall design architecture according to some embodiments of the present specification.

Based on the above design solution, the present specification further provides a corresponding method for labeling data samples. Referring to FIG. 2, the method comprises the following steps.

S101. Obtain a set of data samples without determined labels and a set of data samples with determined labels. For convenience of description, the signs "U" and "L" are still used to represent the "set of data samples without determined labels" and the "set of data samples with determined labels," respectively.

As described above, it may be possible that samples in U have no labels at all, or that all or some of the samples have undetermined labels where the accuracy of these undetermined labels cannot be guaranteed. L refers to a set of existing samples carrying reliable labels. U and L have the same demand for overall, but have different data features.

According to the preceding description, the combination of U and L may be used as the training sample when the model is trained. One of the important requirements for model training may be that the model is applicable to make predictions for two different data types in U and L, which requires a certain sample numbers of both U and L and no large sample number disparity between U and L. Since a model meeting the performance requirements can be trained with L alone, it can be concluded here that the absolute number of samples in L is sufficient; however, the number of samples in U has some uncertainty. If the number of samples in U is too low, it may be impossible to provide sufficient data features of U during the training, which may cause the trained model being unable to adapt to predictions for U-type data.

In some embodiments, if the number of samples in U is insufficient, a Generative Adversarial Network (GAN) may be used to generate some samples by simulating the U situation. GAN is a technology that may construct new samples according to existing true samples. A Gan may include a generative model and a distinguishing model. The functions of the generative model may include capturing a distribution of existing sample data, and using a noise conforming to the distribution (e.g., uniform distribution, Gaussian distribution, and the like) to generate new samples similar to true samples, the more similar the better; and the distinguishing model may be a binary classifier and used for determining whether a sample is a true sample or a generated sample.

In the GAN training process, one of the generative model and the distinguishing model may be fixed, the network weight of the other model may be updated, and the process is alternated and iterated in this way. In this process, both the generative model and the distinguishing model optimize respective networks as much as possible, thereby forming a contest until the two parties reach a dynamic equilibrium. At this point, the generative model restores the distribution of training data (generating samples that are identical to the true samples), and the distinguishing model is unable to distinguish whether a sample is a true sample or a generated sample.

Figure 3:
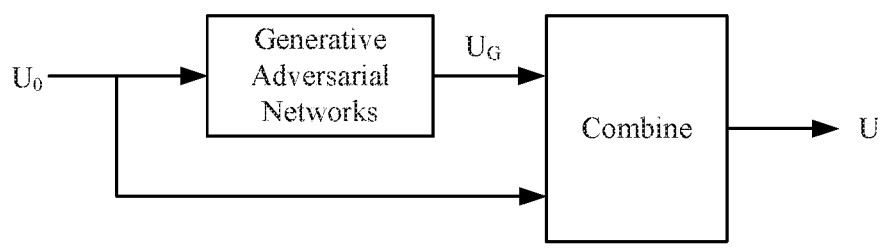
FIG. 3 is a schematic diagram of generating data samples without determined label according to some embodiments of the present specification.

Assuming that the number of initially provided to-be-processed samples (represented by $U_0$ in the present specification) does not meet the training requirement, $U_0$ may be input into a GAN, and the GAN outputs a set of generated samples (represented by $U_G$ in the present specification) that have the same distribution as $U_0$; then, $U_0$ and $U_G$ are combined, as shown in FIG. 3. The process may be illustrated by: $U=U_0+U_G$. In some embodiments, the "same distribution" in the present specification may not refer to the same distribution in the strict mathematical sense, but a same distribution simulated by the GAN.

Since the GAN can both generate samples with labels and generate samples without labels, different sample generating manners may be used according to different situations of $U_0$. If all samples in $U_0$ are samples with labels, there may be two processing manners: 1) inputting both the features and the labels of $U_0$ into the GAN to obtain $U_G$ with labels, in which case all samples in U are samples with labels, and 2) only inputting the features of $U_0$ into the GAN to obtain $U_G$ without labels, in which case only some samples in U have labels.

If all samples in $U_0$ are samples without labels or only some samples in $U_0$ have labels, the features of $U_0$ may be input into the GAN to obtain $U_G$ without labels, in which case the samples in U have the same label carrying situation as those in $U_0$.

The number of samples in $U_G$ that need to be generated may be determined according to training requirements, which may include a requirement for an absolute sample number and a requirement for a relative sample number. In some embodiments, the ratio of U to L may not be lower than 1:4, and U may be larger than L. The ratio requirement may be designed according to the actual situation, which is not limited in the present application.

S102. Combine the set of data samples without determined labels and the set of data samples with determined labels, and use the combined samples for training to obtain a prediction model. The combined sample set S (wherein S=U+L) may be used for model training. Since all samples in L have labels, the label-carrying situation of the samples in S is determined by the label-carrying situation of the samples in U.

If all samples in U have labels, then all samples in S also have labels, and at this point, the training requirement becomes a supervised learning problem. If none of the samples in U has any label or only some samples in U have labels, then some of the samples in S have labels, and at this point, the training requirement becomes a semi-supervised learning problem. Semi-supervised learning is a technology that uses some samples with labels and some samples without labels to execute model training. In the current technologies, samples with labels and samples without labels in semi-supervised learning are data samples of the same type. However, U and L in the present application are two sets of samples not completely the same, which is different from conventional application scenarios of the semi-supervised learning. Since the overall requirements are the same, a semi-supervised learning algorithm may still be used at the algorithm level. However, the training results may meet the application requirements only after multiple adjustments through subsequent checking steps.

In some embodiments, different application scenarios may require different models and corresponding learning algorithms, which is not limited in the present specification. For example, for text recognition applications, a deep learning model may be constructed based on a Recurrent neural Network (RNN) to train text data.

S103. Input one or more data samples without determined labels from the set of data samples without determined labels into the prediction model, and determine the corresponding prediction values output by the model as learning labels of the one or more data samples without determined labels.

With regard to the prediction model produced in S102, a data sample in U may be input into this model. In the present specification, a prediction value output by the model is referred to as a "learning label" of the data sample, and it should be noted that this learning label does not necessarily depend on whether a sample in U has a label or if the label is accurate.

In some embodiments, the "data samples without determined labels" here may be all the samples in U or may be a part of the samples in U. For example, if a GAN is used in S101 to generate new samples, only the samples in the current U that belong to $U_0$ may be input into the prediction model in this step. The reason may be because $U_0$ is the true data, in contrary to $U_G$, and it makes more sense to subsequently check this part of the data. Moreover, from the perspective of "labeling" requirements, only $U_0$ is an object that truly needs to undergo the labeling processing. It should be clarified here that "the data samples that belong to $U_0$" may not be equivalent to $U_0$, since the size of U gradually decreases along with the iteration of the whole solution, and correspondingly "the data samples that belong to $U_0$" gradually decreases as well.

In some embodiments, U (or $U_0$) may also be sampled in this step, and only a sampling result is input into the prediction model, thereby obtaining learning labels of the sampling result. The purpose of the sampling is to lower the checking cost, which may be implemented in this step or in the subsequent steps.

S104. Obtain a sampling subset having the learning labels according to the current set of data samples without determined labels, and check the learning labels of the sampling subset, so as to obtain an accuracy rate of the learning labels.

If the sampling processing is not performed in S103, all the data samples with learning labels are sampled in this step to obtain a sampling subset; if the sampling processing has been performed in S103, a result output from S103 may be directly used in this step as the sampling subset.

In some embodiments, the sampling size may be determined according to actual needs, and the following several factors may be considered in a comprehensive manner: 1) whether the sampling number is sufficiently representative: the larger the sampling number, the more representative it is; 2) impact on the checking cost: the smaller the sampling number, the lower the checking cost is; and 3) impact on the iteration speed: the larger the sampling number, the more useful information there is after each time of checking for feedback to next time of learning, which correspondingly improves the iteration speed of the overall solution.

In some embodiments, a dynamic sampling rate may also be used in the iteration process. For example, as the iteration proceeds, the model performance gradually becomes steady, and the sampling rate may be gradually lowered. One of ordinary skills in the art may design a sampling solution according to actual needs, which is not limited in the present specification.

S105. Determine if the accuracy rate of the learning labels meets a preset requirement. If yes, the method proceeds to S107; otherwise, the method proceeds to execute S106 and then return to S102.

S106. Label the data samples in the sampling subset with the label checking result that comprises reliable labels for the data samples, and move the sampling subset from the set of data samples without determined labels to the set of data samples with determined labels.

S107. Label the remaining data samples in the set of data labels without determined labels with their corresponding learning labels.

Assuming that Us is used to represent a sampling subset, if the accuracy rate of the learning labels of Us reaches a criterion (e.g., 95%), it is considered that learning labels of the entire U (or $U_0$) are trustworthy and may be output directly as labeling results; otherwise, the next round of learning may be triggered.

The checked Us is equivalent to having reliable labels. In the next round of learning, Us may be used as the "samples with determined labels," i.e., U and L are updated as follows before each iteration: U=U−Us and L=L+Us.

Through the iteration process in S102-S106, data samples with reliable labels gradually increase and these data samples are data samples having "new type data" features. Therefore, the accuracy rate of the label learning is continuously optimized, and the model gradually adapts to the predictions for the "new type data" to ultimately meet the application requirements.

Note that the U after the iteration stops may be different from the initial U. Therefore, the ultimately output labeling result should comprise "the latest learning labels of the data samples in the current U" and "labels that have been checked and confirmed to be reliable in each of the iteration processes".

Figure 4:
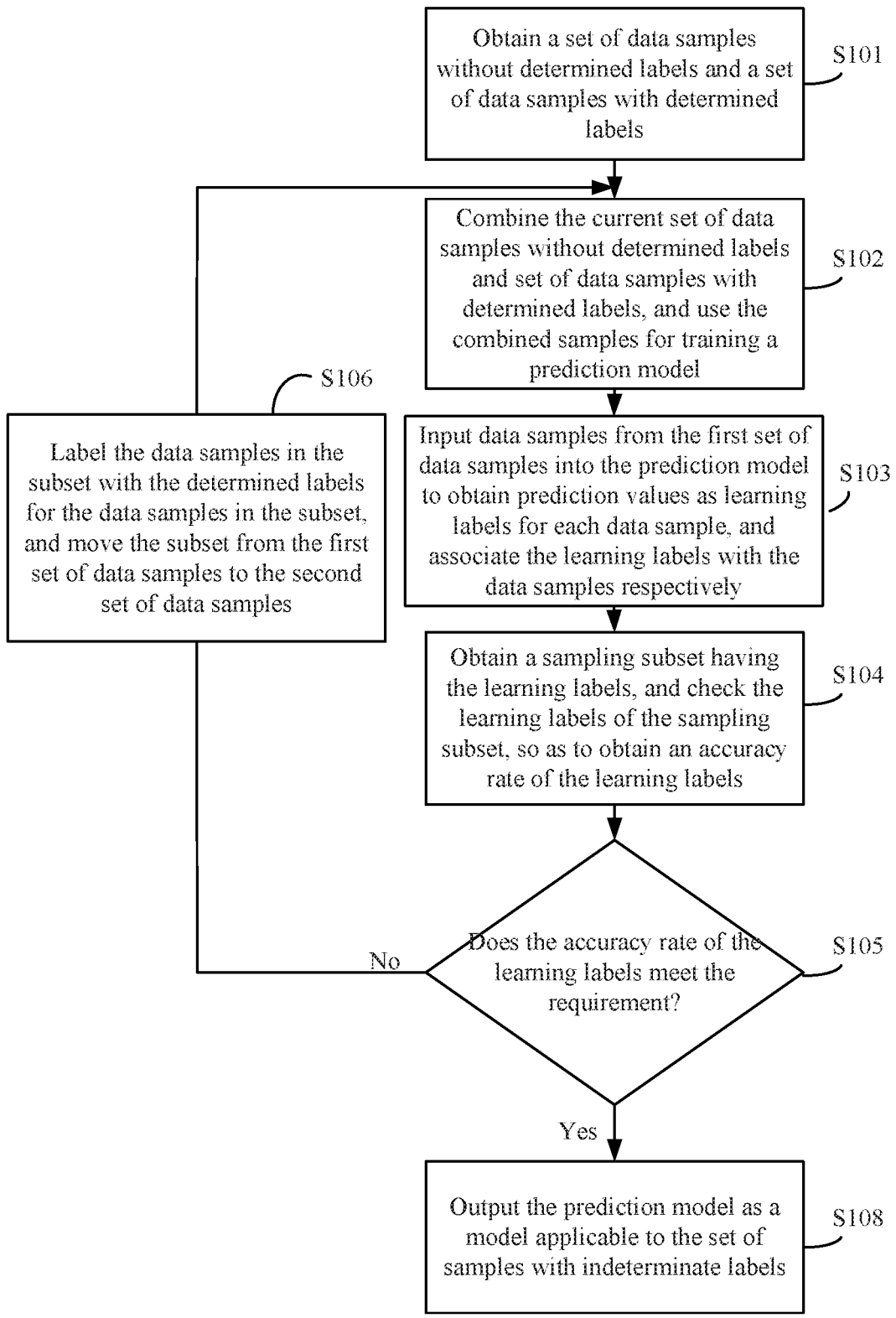
FIG. 4 is a flowchart of a data model training method according to some embodiments of the present specification.

In addition, after the iteration stops, the final prediction model may also be used as another piece of output information. As shown in S108 in FIG. 4 (the other steps are the same as those shown in FIG. 2 and will not be repeated here), this model is applicable to two different data types, U and L.

By applying the solution provided in the present specification, an enterprise that has already possessed mass data and a relatively mature prediction model can effectively output its own prediction capability to provide technical services to clients or partners, and at the same time, can also continuously enhance the prediction capability of its own model.

For example, risk control systems of e-commerce platforms and payment platforms have already had powerful text recognition capabilities, and can recognize information, such as spamming, advertisement, violence, terrorism, politics, pornography, gambling and drug abuse, from user generated contents. External merchants of some other industries may also have similar demands, such as Micro blog, video, live streaming, and other User Generated Content (UGC) related fields. If these external merchants do not have capability to accurately label UGC samples, they may adopt the technical solutions provided by the present specification. In particular, these external merchants may learn sample data provided by other industries in combination with spam text data and recognition models of the e-commerce platforms and payment platforms, which is more efficient and easier to realize large-scale operations compared to the manner in which external samples are fully manually labeled or corrected.

Figure 5:
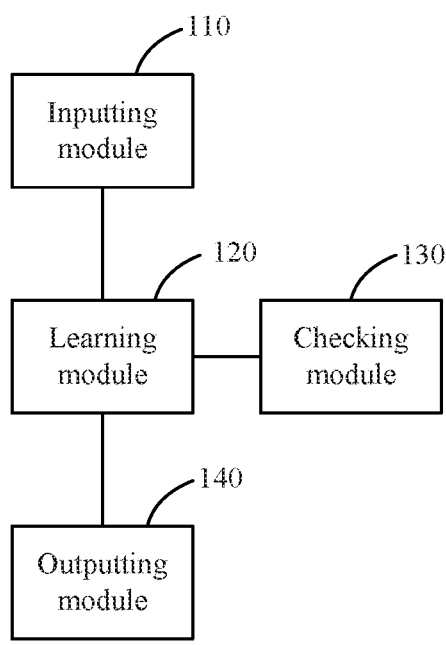
FIG. 5 is a schematic structural diagram of an apparatus for labeling data samples and a training apparatus according to some embodiments of the present specification.

Corresponding to the above method embodiments, the embodiments of the present specification further provide an apparatus for labeling data samples and/or training a prediction model. Referring to FIG. 5, the apparatus may comprise: an inputting module 110 configured to obtain a first set of data samples without determined labels and a second set of data samples with determined labels; a learning module 120 configured to combine the current first set of data samples without determined labels and the second set of data samples with determined labels, and use the combined samples for training to obtain a prediction model; input a sample without determined label from the current first set of data samples without determined labels into the prediction model, and determine a prediction value output by the model as a learning label of the sample without a determined label; a checking module 130 configured to obtain a sampling subset having data samples with learning labels according to the current set of data samples without determined labels, check the learning labels of the sampling subset, so as to obtain an accuracy rate of the learning labels, and if the accuracy rate of the learning labels does not meet a preset requirement, label data samples in the sampling subset with the corresponding learning labels, and move the sampling subset from the current first set of data samples without determined labels to the second set of data samples with determined labels; wherein the learning module 120 and the checking module 130 cooperate with each other to execute the above iteration until an accuracy rate of learning labels meets a preset requirement; and an outputting module 140 configured to, after the iteration ends, label the remaining data samples in the first set of samples with the current learning labels corresponding to the remaining data samples, and/or configured to output, after the iteration ends, the current prediction model as a prediction model applicable to the set of data samples without determined labels.

In some embodiments, if all samples in the set of data samples without determined labels are samples with labels, the learning module 120 may be configured, for example, to use a supervised learning algorithm to train the combined samples to obtain a prediction model.

If all samples in the set of data samples without determined labels are samples without labels, or only some samples in the set of data samples with to-be-determined labels have labels, the learning module 120 may be configured, for example, to use a semi-supervised learning algorithm to train the combined samples to obtain a prediction model.

In some embodiments, the inputting module 110 may comprise: a generating sub-module configured to input, when the number of samples in an initially obtained set of to-be-processed samples does not meet a preset requirement, the set of to-be-processed samples into the GAN to obtain a set of generated samples that have the same distribution as the set of to-be-processed samples; and a combining sub-module configured to combine the set of to-be-processed samples and the set of generated samples to obtain a set of data samples with to-be-determined labels.

In some embodiments, the learning module 120 may be configured, for example, to input the samples in the set of data samples with to-be-determined labels that belong to the set of to-be-processed samples into the prediction model.

In some embodiments, if all samples in the set of to-be-processed samples are samples with labels, the generating sub-module 130 may be configured, for example, to input both the features and the labels of the set of to-be-processed samples into the GAN to obtain a set of generated samples that have the same distribution as the set of to-be-processed samples, all samples in the set of generated samples being samples with labels; or input the features of the set of to-be-processed samples into the GAN to obtain a set of generated samples that have the same distribution as the set of to-be-processed samples, all samples in the set of generated samples being samples without labels.

If all samples in the set of to-be-processed samples are samples without labels or only some samples in the set of to-be-processed samples have labels, the generating sub-module 130 may be configured, for example, to input the features of the set of to-be-processed samples into the GAN to obtain a set of generated samples that have the same distribution as the set of to-be-processed samples, all samples in the set of generated samples being samples without labels.

The embodiments of the present specification further provide a computer device, which at least comprises a memory, a processor and a computer program stored in the memory and executable on the processor, wherein the processor, when executing the program, implements the foregoing method for labeling data samples and/or training a prediction model. The method at least comprises: obtaining a set of data samples without determined labels and a set of data samples with determined labels; performing iteration processing with the following steps until an accuracy rate of learning labels meets a preset requirement: combining the current set of data samples without determined labels and the set of data samples with determined labels, and using the combined samples for training to obtain a prediction model; inputting a data sample without determined label in the set of data samples without determined labels into the prediction model, and determining a prediction value output by the model as a learning label of the data sample; obtaining a sampling subset having the learning labels according to the current set of data samples without determined labels, checking the learning labels of the sampling subset, so as to obtain an accuracy rate of the learning labels, and if the accuracy rate of the learning labels does not meet a preset requirement, determining a label checking result as a labeling result of the sampling subset (e.g., labeling the data samples in the sampling subset with the label checking result, where the label checking result comprises reliable labels for the data samples obtained during the checking process), and moving the sampling subset from the set of data samples without determined labels to the set of data samples with determined labels; and after the iteration ends, determining the current learning labels of the samples without determined label as the labeling result (e.g., labeling, the data samples in the current first set of samples without determined labels, with the learning labels corresponding to the data samples, as reliable labels), and/or outputting the current prediction model as a prediction model applicable to the set of data samples without determined labels.

Figure 6:
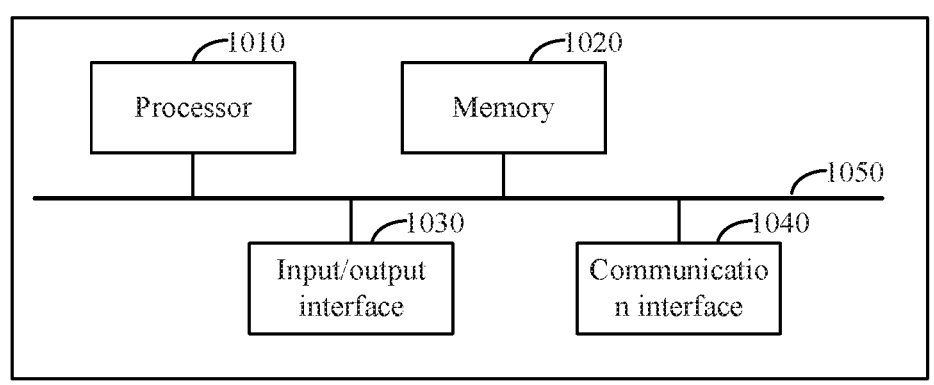
FIG. 6 is a schematic structural diagram of a device for configuring the apparatuses according to some embodiments of the present specification.

FIG. 6 is a schematic hardware structural diagram of an exemplary computing device according to some embodiments of the present specification. The device may comprise: a processor 1010, a memory 1020, an input/output interface 1030, a communication interface 1040, and a bus 1050, wherein the processor 1010, the memory 1020, the input/output interface 1030, and the communication interface 1040 are in communication connection with each other inside the device via the bus 1050.

The processor 1010 may be implemented with a general Central Processing Unit (CPU), a micro-processor, an Application Specific Integrated Circuit (ASIC), or one or more integrated circuits for executing relevant programs to achieve the technical solutions according to the embodiments of the present specification.

The memory 1020 may be implemented in the form of a Read-Only Memory (ROM), a Random-Access Memory (RAM), a static storage device, or a dynamic storage device. The memory 1020 may store an operating system and other application programs. When the technical solutions according to the embodiments of the present specification are achieved through software or firmware, relevant program codes are stored in the memory 1020 and are called and executed by the processor 1010.

The input/output interface 1030 may be used to connect input/output modules for achieving information input/output. The input/output modules may be configured in the device as parts (not shown), or may also be connected to external devices to provide corresponding functions, wherein the input device may comprise a keyboard, a mouse, a touchscreen, a microphone, various sensors, and the like, and the output device may comprise a display, a loudspeaker, a vibration, an indicator, and the like.

The communication interface 1040 may be used to connect a communication module (not shown) to achieve communication interactions between this device and other devices, wherein the communication module may communicate in a wired manner (e.g., USB, network cable, and the like) or in a wireless manner (e.g., a mobile network, WIFI, Bluetooth, and the like).

The bus 1050 may comprise a path for information transmission among various parts of the device (e.g., the processor 1010, the memory 1020, the input/output interface 1030, and the communication interface 1040).

Although the above-described device only illustrates the processor 1010, the memory 1020, the input/output interface 1030, the communication interface 1040 and the bus 1050, the device may further comprise other parts required for normal operations in an exemplary implementation process. In addition, it should be appreciated by one of ordinary skills in the art that the device may only comprise parts required for implementation of the solutions according to the embodiments of the present specification and does not need to comprise all the parts shown in the figure.

The embodiments of the present specification further provide a computer readable storage medium, which stores a computer program. When being executed by a processor, the computer program implements the foregoing data sample label processing method and data model training method. The method at least comprises: obtaining a set of data samples without determined labels and a set of data samples with determined labels; performing iteration processing with the following steps until an accuracy rate of learning labels meets a preset requirement: combining the current set of data samples without determined labels and the set of data samples with determined labels, and using the combined samples for training to obtain a prediction model; inputting a data sample without determined label in the set of data samples without determined labels into the prediction model, and determining a prediction value output by the model as a learning label of the data sample; obtaining a sampling subset having the learning labels according to the current set of data samples without determined labels, checking the learning labels of the sampling subset, so as to obtain an accuracy rate of the learning labels, and if the accuracy rate of the learning labels does not meet a preset requirement, determining a label checking result as a labeling result of the sampling subset (e.g., labeling the data samples in the sampling subset with the label checking result, where the label checking result comprises reliable labels for the data samples obtained during the checking process), and moving the sampling subset from the set of data samples without determined labels to the set of data samples with determined labels; and after the iteration ends, outputting the current prediction model as a prediction model applicable to the set of data samples without determined labels.

In some embodiments, the computer readable media may include permanent, volatile, mobile, and immobile media, which can implement information storage through any method or technology. The information may be computer readable instructions, data structures, program modules, or other data. Examples of storage media of computers include, but are not limited to, Phase-change Random Access Memories (PRAMs), Static Random Access Memories (SRAMs), Dynamic Random Access Memories (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassette tapes, cassette and disk memories or other magnetic memory devices, or any other non-transmission media, which can be used for storing information accessible to a computation device. According to the definitions in the specification, the computer readable media do not include transitory media, such as modulated data signals and carriers.

With the above description of the implementations, one of ordinary skill in the art may clearly understand that the embodiments of the present specification may be achieved through software plus a necessary general hardware platform. Based on such understanding, the technical solutions of the embodiments of the present specification, in essence, or the portion thereof that contributes to the current technologies, may be embodied in the form of a software product. The computer software product may be stored in a storage medium, such as a ROM/RAM, a magnetic disk, an optical disc, and the like, and includes several instructions to cause a computer device (which may be a personal computer, a server, or a network device) to execute methods according to the embodiments or some parts of the embodiments of the present specification.

The systems, devices, modules or units set forth in the foregoing embodiments may be achieved, for example, by computer chips or entities, or by products with certain functions. A typical implementation device is a computer. An exemplary form of the computer may be a personal computer, a laptop computer, a cell phone, a camera phone, a smart phone, a PDA (personal digital assistant), a media player, a navigation device, an email sending and receiving device, a game console, a tablet computer, a wearable device or a combination of any of these devices.

The embodiments in this specification are described in a progressive manner with each embodiment focused on differences from other embodiments, and the embodiments may be mutually referenced for identical or similar parts. In particular, the apparatus embodiments are described in a relatively simple manner, as the apparatus embodiments are substantially similar to the method embodiments. The description of the method embodiments may be referenced for the related parts. The above-described apparatus embodiments are merely exemplary, wherein the units described as separate parts may or may not be physically separated. During implementation of the solutions of the embodiments of the present specification, functions of various modules may be achieved in the same piece or multiple pieces of software and/or hardware. Alternatively, the objectives of the solutions of the present specification can be achieved by selecting some or all of the modules as needed, which can be understood and implemented by one of ordinary skill in the art without creative effort.

The above-described is only exemplary implementations of the embodiments of the present specification. It should be noted that one of ordinary skill in the art may make a number of improvements and modifications without departing from the principle of the embodiments of the present specification, and all these improvements and modifications shall fall within the protection scope of the embodiments of the present specification.

What is claimed is:

1. A method, comprising:
   obtaining a first set of data samples without determined labels and a second set of data samples with determined labels;
   iteratively performing the following steps until an accuracy rate meets a preset requirement:
   training a prediction model based on a combination of the first set of data samples and the second set of data samples;
   inputting data samples from the first set of data samples into the prediction model to obtain prediction values as learning labels for each data sample, and associating the learning labels with the data samples in the first set of data samples respectively;
   obtaining a subset from the first set of data samples by sampling the first set of data samples at a sampling rate, wherein the subset comprises data samples associated with learning labels;
   obtaining determined labels for the data samples in the subset;
   obtaining the accuracy rate based at least on the learning labels of the data samples in the subset and the determined labels of the data samples in the subset;
   determining whether the accuracy rate meets the preset requirement; and
   responsive to determining that the accuracy rate does not meet the preset requirement, reducing the sampling rate, labeling the data samples in the subset with the determined labels for the data samples in the subset, and moving the subset from the first set of data samples to the second set of data samples; and after the accuracy rate meets the preset requirement, labeling the remaining data samples in the first set with the associated learning labels.

2. The method according to claim 1, further comprising: outputting the prediction model as a model applicable to the set of samples without determined labels.

3. The method according to claim 1, wherein the first set of data samples comprises data samples with undetermined labels, and training the prediction model comprises:
training the prediction model with a supervised learning algorithm.

4. The method according to claim 1, wherein the first set of data samples comprises data samples without labels, and training the prediction model comprises:
training the prediction model with a semi-supervised learning algorithm.

5. The method according to claim 1, wherein obtaining the first set of data samples without determined labels comprises:
when a quantity of data samples in an initially obtained set of to-be-processed data samples does not meet a preset threshold, inputting the set of to-be-processed data samples into a Generative Adversarial Network (GAN) to obtain a set of generated data samples with a distribution that is the same as a distribution of the set of to-be-processed data samples; and
combining the set of to-be-processed data samples and the set of generated data samples to obtain the first set of data samples.

6. The method according to claim 5, wherein inputting the data samples from the first set of data samples into the prediction model comprises:
inputting data samples in the set of to-be-processed data samples into the prediction model.

7. The method according to claim 5, wherein, if the set of to-be-processed data samples comprise data samples with undetermined labels, inputting the set of to-be-processed data samples into the GAN to obtain the set of generated data samples with the distribution that is the same as the distribution of the set of to-be-processed data samples comprises:
inputting both features and the undetermined labels of the set of to-be-processed data samples into the GAN to obtain a set of generated data samples with the distribution that is the same as the distribution of the set of to-be-processed data samples, wherein data samples in the set of generated data samples have undetermined labels; or
inputting the features of the set of to-be-processed data samples into the GAN to obtain a set of generated data samples with the distribution that is the same as the distribution of the set of to-be-processed data samples, wherein the data samples in the set of generated data samples do not have labels.

8. The method according to claim 5, wherein, if the set of to-be-processed data samples comprise data samples without labels, inputting the set of to-be-processed data samples into the GAN to obtain the set of generated data samples with the distribution that is the same as the distribution of the set of to-be-processed data samples comprises:
inputting features of the set of to-be-processed data samples into the GAN to obtain a set of generated data samples with the distribution that is the same as the distribution of the set of to-be-processed data samples, wherein the data samples in the set of generated data samples do not have labels.

9. A system for labeling data samples, comprising a processor and a non-transitory computer-readable storage medium storing instructions executable by the processor to cause the system to perform operations comprising:
obtaining a first set of data samples without determined labels and a second set of data samples with determined labels;
iteratively performing the following steps until an accuracy rate meets a preset requirement:
training a prediction model based on a combination of the first set of data samples and the second set of data samples;
inputting data samples from the first set of data samples into the prediction model to obtain prediction values as learning labels for each data sample, and associating the learning labels with the data samples in the first set of data samples respectively;
obtaining a subset from the first set of data samples by sampling the first set of data samples at a sampling rate, wherein the subset comprises data samples associated with learning labels;
obtaining determined labels for the data samples in the subset;
obtaining the accuracy rate based at least on the learning labels of the data samples in the subset and the determined labels of the data samples in the subset;
determining whether the accuracy rate meets the preset requirement; and
responsive to determining that the accuracy rate does not meet the preset requirement, reducing the sampling rate, labeling the data samples in the subset with the determined labels for the data samples in the subset, and moving the subset from the first set of data samples to the second set of data samples; and
after the accuracy rate meets the preset requirement, labeling the remaining data samples in the first set with the associated learning labels.

10. The system according to claim 9, wherein the operations further comprise:
outputting the prediction model as a model applicable to the set of samples without determined labels.

11. The system according to claim 9, wherein the first set of data samples comprises data samples with undetermined labels, and training the prediction model comprises:
training the prediction model with a supervised learning algorithm.

12. The system according to claim 9, wherein the first set of data samples comprises data samples without labels, and training the prediction model comprises:
training the prediction model with a semi-supervised learning algorithm.

13. The system according to claim 9, wherein obtaining the first set of data samples without determined labels comprises:
when a quantity of data samples in an initially obtained set of to-be-processed data samples does not meet a preset threshold, inputting the set of to-be-processed data samples into a Generative Adversarial Network (GAN) to obtain a set of generated data samples with a distribution that is the same as a distribution of the set of to-be-processed data samples; and
combining the set of to-be-processed data samples and the set of generated data samples to obtain the first set of data samples.

14. The system according to claim 13, wherein inputting the data samples from the first set of data samples into the prediction model comprises:

inputting data samples in the set of to-be-processed data samples into the prediction model.

15. A non-transitory computer-readable storage medium for labeling data samples, configured with instructions executable by one or more processors to cause the one or more processors to perform operations comprising:
   obtaining a first set of data samples without determined labels and a second set of data samples with determined labels;
   iteratively performing the following steps until an accuracy rate meets a preset requirement:
      training a prediction model based on a combination of the first set of data samples and the second set of data samples;
      inputting data samples from the first set of data samples into the prediction model to obtain prediction values as learning labels for each data sample, and associating the learning labels with the data samples in the first set of data samples respectively;
      obtaining a subset from the first set of data samples by sampling the first set of data samples at a sampling rate, wherein the subset comprises data samples associated with learning labels;
      obtaining determined labels for the data samples in the subset;
      obtaining the accuracy rate based at least on the learning labels of the data samples in the subset and the determined labels of the data samples in the subset;
      determining whether the accuracy rate meets the preset requirement; and
      responsive to determining that the accuracy rate does not meet the preset requirement, reducing the sampling rate, labeling the data samples in the subset with the determined labels for the data samples in the subset, and moving the subset from the first set of data samples to the second set of data samples; and
   after the accuracy rate meets the preset requirement, labeling the remaining data samples in the first set with the associated learning labels.

16. The storage medium according to claim 15, wherein the operations further comprise:
   outputting the prediction model as a model applicable to the set of samples without determined labels.

17. The storage medium according to claim 15, wherein the first set of data samples comprises data samples with undetermined labels, and training the prediction model comprises:
   training the prediction model with a supervised learning algorithm.

18. The storage medium according to claim 15, wherein the first set of data samples comprises data samples without labels, and training the prediction model comprises:
   training the prediction model with a semi-supervised learning algorithm.

19. The storage medium according to claim 15, wherein obtaining the first set of data samples without determined labels comprises:
   when a quantity of data samples in an initially obtained set of to-be-processed data samples does not meet a preset threshold, inputting the set of to-be-processed data samples into a Generative Adversarial Network (GAN) to obtain a set of generated data samples with a distribution that is the same as a distribution of the set of to-be-processed data samples; and
   combining the set of to-be-processed data samples and the set of generated data samples to obtain the first set of data samples.

20. The storage medium according to claim 19, wherein inputting the data samples from the first set of data samples into the prediction model comprises:
   inputting data samples in the set of to-be-processed data samples into the prediction model.

* * * * *